United States Patent [19]

Ballard

[11] 3,730,019
[45] May 1, 1973

[54] AIRCRAFT SEAT LOCK ACTUATOR

[76] Inventor: Charles U. Ballard, 4253 Lenox Boulevard, Inglewood, Calif. 90304

[22] Filed: July 14, 1971

[21] Appl. No.: 162,411

[52] U.S. Cl. .................. 74/502, 74/108, 244/122 R, 297/355, 297/363
[51] Int. Cl. ............................................... F16c 1/18
[58] Field of Search ................... 74/501, 502, 108; 244/122 R; 297/363, 364, 365, 355

[56] References Cited

UNITED STATES PATENTS

| | | | |
|---|---|---|---|
| 3,042,449 | 7/1962 | Hutchinson et al. | 74/501 UX |
| 3,444,701 | 5/1969 | Randolph | 74/501 X |

*Primary Examiner*—Charles J. Myhre
*Assistant Examiner*—F. D. Shoemaker
*Attorney*—Allan D. Mockabee

[57] ABSTRACT

A device for transmitting motion and force to actuate a slave element and more particularly to remotely operate a trigger for an airplane seat lock or the like including a push button, a flexible element for transmitting the force exerted on the push button to a remote trigger actuator, including means for translating linear movement of the push button in one path to movement of the flexible element in another path at an angle to the linear path, and also to convert the push exerted on the push button to a pull exerted on the flexible element.

9 Claims, 3 Drawing Figures

Patented May 1, 1973
3,730,019
CHARLES U. BALLARD
INVENTOR.
BY
ATTORNEY
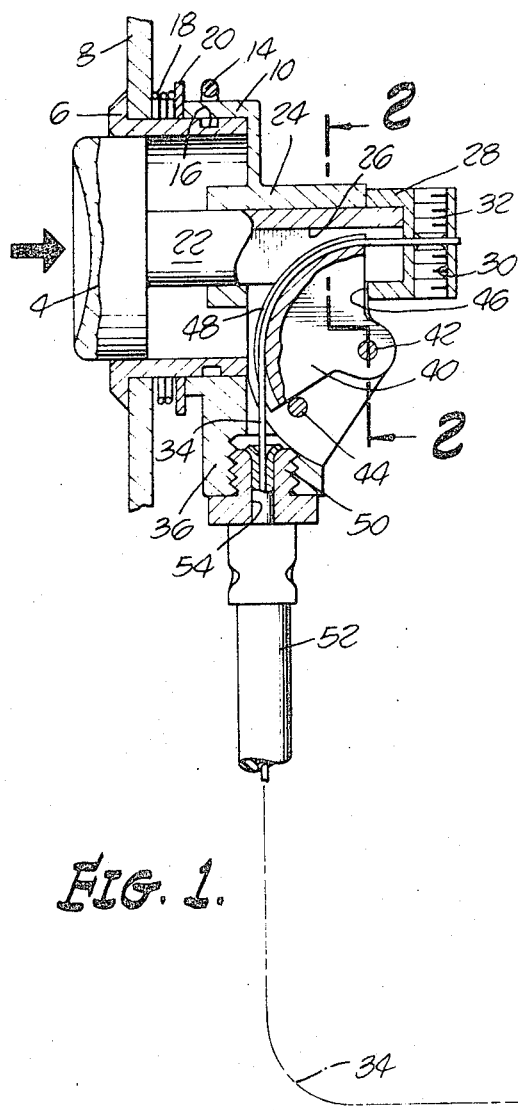
FIG. 1.
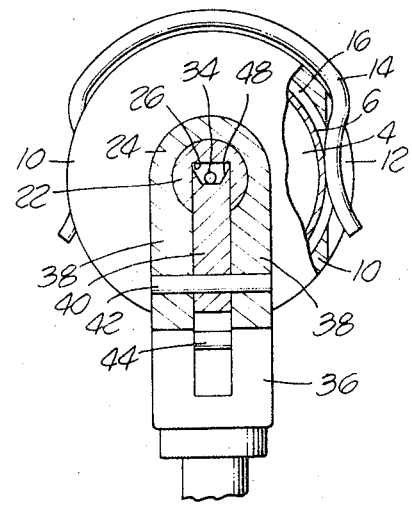
FIG. 2.
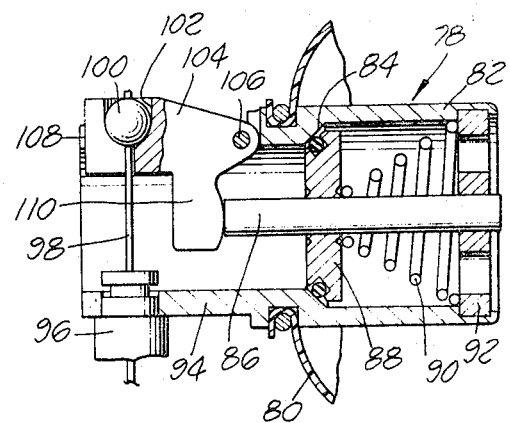
FIG. 3.
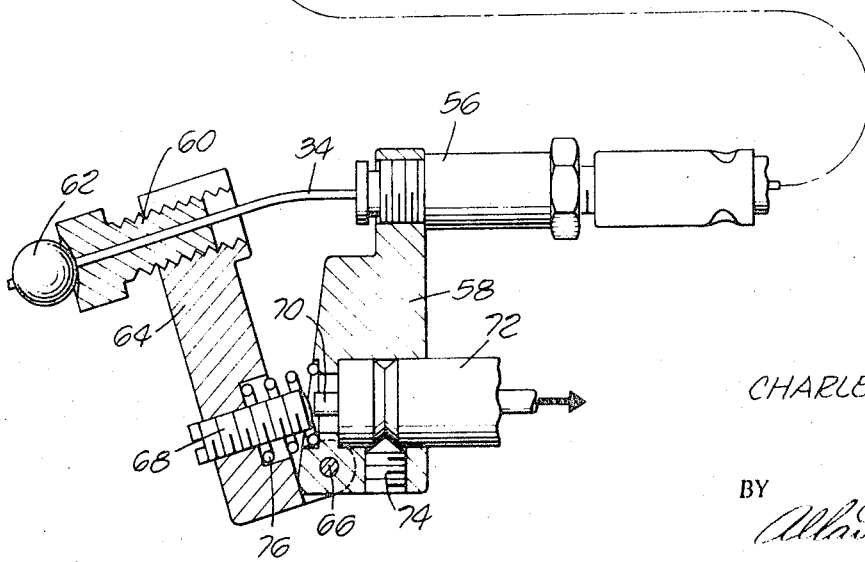

AIRCRAFT SEAT LOCK ACTUATOR

This invention relates to a remote control for an adjustable airplane seat lock or to other suitable mechanism wherein a push button is used to transmit force to a slave unit.

Many airplane seat locks are in the form of hydraulic systems which can be opened to permit movement of the seat back and then closed to lock the system and the seat back against movement. Controls for such seat locks are customarily located on the arm of the seat for convenient pressure with the finger of the seat occupant.

Some remote controls have embodied a conduit with a liquid therein, pressure on one end of the column of liquid in the conduit being transmitted to a suitable trigger for actuating the hydraulic seat lock per se. These have been subject to faulty operation because of loss of liquid due to its inherent expansion and contraction with temperature changes, and also because of difficulty in sealing the hydraulic actuator.

Purely mechanical controls for unlocking and locking the seat lock have been used but they have not been successful. They are too bulky and heavy and their flexibility is so restricted that they cannot be made to operate around sharp bends. They have required too much finger pressure because when the wire is pressed through a guide tube, the friction between the wire and the wall of the tube is quite great.

It is an object of the present invention to provide a control for airplane seat locks or the like which is mechanical, as distinguished from hydraulic, and wherein it is so constructed that frictional drag is greatly reduced and dependable ease of operation is provided.

Another object is to provide a seat lock control embodying a flexible wire and a guide tube wherein pressure on an actuating button is converted into a pull on the wire, as distinguished from the mechanical types wherein a push is exerted on the end of the wire and the tendency for the wire to flex laterally creates undue frictional drag on the guide tube.

A further object is to provide means for converting the linear pushing movement on the actuating button to a pulling movement in a direction at an angle to the linear movement of the button, wherein friction at the area of conversion is reduced to a minimum.

A further object is to provide improved means for mounting the flexible wire and its guide tube at each end of these elements and for operating a remote movable element which in turn is arranged to actuate a trigger comprising a portion of the hydraulic lock mechanism.

The above and other objects will more fully appear from the following description in connection with the accompanying drawing:

FIG. 1 is a sectional view through an embodiment of the device showing portions of the flexible wire and guide tube broken away and showing part of a trigger device to be remotely actuated;

FIG. 2 is a section taken approximately on the line 2—2 of FIG. 1.

FIG. 3 is a longitudinal vertical sectional view through a form of the device as applied to an air pillow.

There is illustrated a push button 4 mounted for reciprocating movement in a guide 6, which in turn is located in a suitable aperture in a wall 8 which may conveniently be part of the arm support of an airplane seat. The guide 6 extends into a cup 10 having slots 12 at each side thereof to receive a spring wire clip 14 which has portions thereof lying in grooves 16 in opposite sides of the guide 6. If desired, a compression spring 18 can be interposed between the wall 8 and a retainer ring 20 on the guide 6. More details of this push button mounting are set forth in U.S. Pat. No. 3,553,967 to Porter.

The push button 4 has a shank 22 slidable linearly in a a tubular guide 24 which is formed in the back wall of the cup 10. The shank 22 has a longitudinal slot 26 therein and its rear or right end has a cap 28 pressed thereon. This cap is provided with a threaded transverse bore 30 to receive a set screw 32 which is threaded inwardly to bear against the end of a flexible cable or wire 34 which extends through the center of the cap 28 and lies in the slot 26 in the shank 22.

The cup 10 has a boss 36 extending downwardly therefrom, the cup and boss as a unit comprising what I designate as a push button mount. The push button mount also includes a pair of parallel spaced wall portions 38 which preferably are cast integrally with the cup 10 and the boss 36. Between the spaced walls 38 is a movable quadrant 40 mounted on a pivot 42 extending between the spaced walls 38. As viewed in FIG. 1, the lower edge of the quadrant 40 is adapted to engage a stop pin 44 and the upper edge of the quadrant is adapted to engage the right or rear end of a slot 46 which is provided at the juncture to the walls 38 and the cylindrical guide 24. The quadrant 40 is provided with a grooved arcuate edge 48 in which the flexible cable or wire 34 is located.

The wire 34 passes through a nipple 50 threaded into the underside of the boss 36 and thence into and through a flexible guide tube 52 whose upper end is seated in a socket 54 in the nipple 50. Wire 34 adjacent its other end passes through a flexible tube anchoring nipple 56 which is threaded into the upper portion of an anchor assembly mount 58 mounted on a suitable stationary support. The wire or cable 34 passes through an anchoring nipple 60 and is provided with an end ball 62 to keep the wire from slipping from the nipple 60.

The anchoring nipple 60 is threaded into the upper portion of a movable anchor element 64 pivotally connected at 66 to a lower portion of the anchor assembly mount 58. The movable element 64, adjacent its supporting pivot 66, is provided with a set screw 68 which, when the element 64 is pulled to the right by the wire 34, will press and move a trigger 70 in a trigger guide 72 mounted in the lower portion of the anchor assembly mount 58 and removably retained therein by a set screw 74. The trigger 70 is adapted to actuate a suitable locking valve in a hydraulic seat lock mechanism, not illustrated. If desired, a spring 76 can be interposed between the movable anchor element 64 and the stationary anchor assembly mount 58 to bias the movable element 64 to the left and to pull the wire 34 to a return position and also to move the push button 4 to the left where it is in position for another operation of the control when desired.

The guide tube 52 for the wire or cable 34 is preferably of a low friction plastic material of a suitable type. The tube may be of Teflon, a DuPont product, or it may be formed of any suitable flexible material and provided with a nylon lining.

One of the important features of the invention is the provision of the quadrant 40 about which the wire or cable 34 is trained and which will rock about its pivot 42 when the push button 4 is pressed with the finger of the seat occupant. This permits the direction of applied force to be changed with a minimum of frictional resistance and as shown, it permits the conversion of the rectilinear movement of the push button to movement in a different direction at an angle to the path of movement of the button. Furthermore, pressure on the push button 4 is converted into a pull on the wire or cable 34 in the operating stroke of the cable. When pressure on the push button is released, the cable will be returned to the position shown in the drawing by the spring 76 which is sufficiently strong because return movement of the cable is free of any working load, such as that necessary to move it in the opposite direction to actuate the trigger 70.

The fact that the cable 34 is operated in each direction by a pulling force exerted on one end or the other, greatly reduces friction in the guide tube 52. In situations where a guided flexible cable is pushed from one end in its working stroke, it will cause the cable to flex laterally and press quite hard against the walls of the guide tube, thereby creating excessive frictional drag. However, with my device, where the cable 34 is pulled instead of being pushed, the drag is reduced to a minimum and a smaller diameter cable can be utilized.

In FIG. 3 there is shown the application of my control to a valve indicated generally at 78 which extends into an air pillow 80 of flexible air impervious material, such as rubber, rubberized cloth, plastic or the like. It is a type of pillow or cushion such as is used in aircraft seats and known as a lumbar pillow for the comfort of persons with back ailments. The valve 78 includes a valve housing 82 having a frusto-conical seat 84. A movable valve stem 86 has a valve head 88 thereon which is biased to the left as viewed in FIG. 3 by means of a spring 90 bearing against an apertured disc 92 which also serves to support and guide the valve stem 86.

The valve housing 82 has an extension 94 which supports one end of a guide tube 96 similar to the guide tube 52 of FIG. 1. In the guide tube 96 is a wire 98 similar to the wire 34 of FIG. 1, and the wire is provided with an end ball 100 which is seated in a socket 102 in an anchor assembly 104 pivotally connected at 106 to the valve housing extension 94, the anchor assembly 104 lying in a slot 108 formed in said extension 94. The anchor assembly 104 has a lateral extension 110 which bears against the end of the valve stem 86 so that when the wire 98 is pulled by pressure on a button, such as the actuator button 4 of FIG. 1, the anchor assembly 104 will partially rotate counterclockwise and open the valve 88. The mechanism of FIG. 3 is utilized to exhaust air from the pillow or cushion 80. Pillows of this type customarily have other means provided for their inflation. These are not gone into herein because they do not have anything to do with the control mechanism of my invention.

It will of course be understood that various changes can be made in the form, details, arrangement and proportions of the various parts without departing from the spirit of the invention.

I claim:

1. A remote control for an adjustable airplane seat lock or the like wherein force is transmitted from the control to a remotely located device having a trigger responsive to the force, wherein the improvement comprises: an elongated flexible element for transmitting a pulling force, push button means engaging a first end of said flexible element and movable under finger pressure to create a pull on the flexible element, an anchor assembly on the other end of the flexible element having a portion movable in response to a pull on the flexible element to actuate a trigger, and a push button mount supporting said push button and said first end of said flexible element, an anchor assembly mount supporting the anchor assembly and the other end of said flexible element, and a guide for said flexible element having its ends connected respectively to said push button mount and said anchor assembly mount.

2. The structure in claim 1, and said anchor assembly being movable with said flexible element and relative to the anchor assembly mount, and said anchor assembly mount including means for supporting a trigger to be actuated.

3. The structure in claim 1, and said guide for said flexible element comprising a flexible tube having a friction reducing plastic inner wall.

4. The structure in claim 1, and said push button means comprising a mount, a push button supported by said mount for movement in a linear path, a guide for said flexible element comprising a tube having one end connected to said push button mount at an angle to the linear path of the push button, said first end of said flexible element being operatively connected to said push button for movement in said linear path, and means carried by said push button mount for translating the linear direction of movement of said first end of the flexible element to movement of an adjustment length of the flexible element in a path at an angle to said linear path.

5. The structure in claim 4, and the direction of movement translating means comprising a rocker element having a pivotal connection with the push button mount and having a curved portion spaced from said pivotal connection and about which a length of said flexible element is trained.

6. A remote control for an adjustable airplane seat lock or the like wherein force is transmitted from the control to a remotely located device having a trigger responsive to the force, wherein the improvement comprises: an elongated flexible force transmitting element, push button means engaging a first end of said flexible element and movable under finger pressure to move the flexible element, an anchor assembly on the other end of the flexible element having a portion movable in response to movement of the flexible element to actuate a trigger, the push button means comprising a mount, a push button supported by said mount for movement in a linear path, a guide for said flexible element comprising a tube having one end connected to said push button mount at an angle to the linear path of the push button, the end of said flexible element being connected to said push button for movement in said linear path, and means carried by said push button mount for translating the linear direction of movement of the end of the flexible element to movement of an adjacent length of the flexible element in a path at an angle to said linear path.

7. The structure in claim 6, and the direction of movement translating means comprising a rocker element having a pivotal connection with said mount and having a curved portion spaced from the pivotal connection and about which a length of said flexible element is trained.

8. The structure in claim 6, and said direction of movement translating means comprising a rocker element having a pivotal connection with the push button mount and having a curved portion spaced from said pivotal connection and about which a length of said flexible element is trained, and said push button mount having stop means in the path of movement of said rocker element at each side thereof to limit the movement of the rocker, and through said flexible element, to similarly limit the movement of the anchor assembly at the other end of the flexible element.

9. The structure in claim 1, and said anchor assembly having a mount and an element carried thereby and movable relative thereto, a guide tube for said flexible element having an end connection to said anchor assembly mount, and said flexible element being connected to said movable anchor assembly element for movement therewith and relative to said mount, and portions of said mount being located in the path of movement of said movable element and having trigger supporting means in said path of movement.

* * * * *